(12) United States Patent
Lee et al.

(10) Patent No.: US 10,418,620 B2
(45) Date of Patent: Sep. 17, 2019

(54) CYLINDRICAL BATTERY INCLUDING PRESSURIZING PART AND METHOD OF MANUFACTURING THE SAME

(71) Applicant: LG Chem, Ltd., Seoul (KR)

(72) Inventors: Hye Youn Lee, Daejeon (KR); Jooyoung Song, Daejeon (KR); Il Hong Kim, Daejeon (KR)

(73) Assignee: LG Chem, Ltd. (KR)

( * ) Notice: Subject to any disclaimer, the term of this patent is extended or adjusted under 35 U.S.C. 154(b) by 182 days.

(21) Appl. No.: 15/506,854

(22) PCT Filed: Sep. 2, 2015

(86) PCT No.: PCT/KR2015/009218
§ 371 (c)(1),
(2) Date: Feb. 27, 2017

(87) PCT Pub. No.: WO2016/052867
PCT Pub. Date: Apr. 7, 2016

(65) Prior Publication Data
US 2017/0294641 A1 Oct. 12, 2017

(30) Foreign Application Priority Data
Sep. 29, 2014 (KR) ........................ 10-2014-0130182

(51) Int. Cl.
*H01M 4/505* (2010.01)
*H01M 2/12* (2006.01)
*H01M 2/34* (2006.01)
*H01M 10/0525* (2010.01)
(Continued)

(52) U.S. Cl.
CPC ........... *H01M 2/345* (2013.01); *H01M 2/023* (2013.01); *H01M 2/0413* (2013.01);
(Continued)

(58) Field of Classification Search
None
See application file for complete search history.

(56) References Cited

U.S. PATENT DOCUMENTS 6,258,477 B1 * 7/2001 Kashihara ........... H01M 2/1241
429/53
6,509,114 B1 1/2003 Nakai et al.
(Continued)

FOREIGN PATENT DOCUMENTS

| CN | 001992392 A | 7/2007 |
|---|---|---|
| CN | 101807710 A | 8/2010 |

(Continued)

OTHER PUBLICATIONS

International Search Report from PCT/KR2015/009218, dated Nov. 30, 2015.

*Primary Examiner* — Lucas J. O'Donnell
(74) *Attorney, Agent, or Firm* — Lerner, David, Littenberg, Krumholz & Mentlik, LLP

(57) ABSTRACT

Disclosed herein is a cylindrical battery including an electrode assembly (jelly roll) including a positive electrode, a separator, and a negative electrode, a cylindrical container including a receiving part for receiving the electrode assembly together with an electrolytic solution, a cap assembly mounted to an open upper end of the cylindrical container, a safety vent mounted in the cap assembly, and a pressurization part located between the safety vent and the receiving part, the pressurization part communicating with the receiving part, the pressurization part being configured to apply a predetermined pressure, which is generated by gas, to the receiving part, wherein the positive electrode includes a lithium composite transition metal oxide represented by Formula 1 in the specification as a positive electrode active material.

20 Claims, 7 Drawing Sheets

(51) Int. Cl.
*H01M 10/0587* (2010.01)
*H01M 2/02* (2006.01)
*H01M 2/04* (2006.01)
*H01M 4/485* (2010.01)
*H01M 4/525* (2010.01)

(52) U.S. Cl.
CPC ......... *H01M 2/1241* (2013.01); *H01M 4/485* (2013.01); *H01M 4/505* (2013.01); *H01M 4/525* (2013.01); *H01M 10/0525* (2013.01); *H01M 10/0587* (2013.01); *H01M 2200/20* (2013.01); *Y02E 60/122* (2013.01); *Y02P 70/54* (2015.11)

(56) References Cited

U.S. PATENT DOCUMENTS

| | | | |
|---|---|---|---|
| 2008/0314482 A1* | 12/2008 | Suzuki | C01G 45/1221 148/559 |
| 2009/0148766 A1 | 6/2009 | Shen et al. | |
| 2010/0209765 A1 | 8/2010 | Bak | |
| 2013/0230749 A1 | 9/2013 | Kim et al. | |
| 2013/0273401 A1 | 10/2013 | Lee et al. | |
| 2014/0199567 A1* | 7/2014 | Kim | H01M 2/1241 429/89 |

FOREIGN PATENT DOCUMENTS

| | | |
|---|---|---|
| CN | 102165624 A | 8/2011 |
| CN | 103299453 A | 9/2013 |
| CN | 103548175 A | 1/2014 |
| CN | 103650199 A | 3/2014 |
| JP | 2000082457 A | 3/2000 |
| JP | 2001143762 A | 5/2001 |
| JP | 2014036010 A | 2/2014 |
| KR | 20080058967 A | 6/2008 |
| KR | 20120038977 A | 4/2012 |
| KR | 20120039181 A | 4/2012 |
| KR | 20130116028 A | 10/2013 |

* cited by examiner

[FIG. 1]
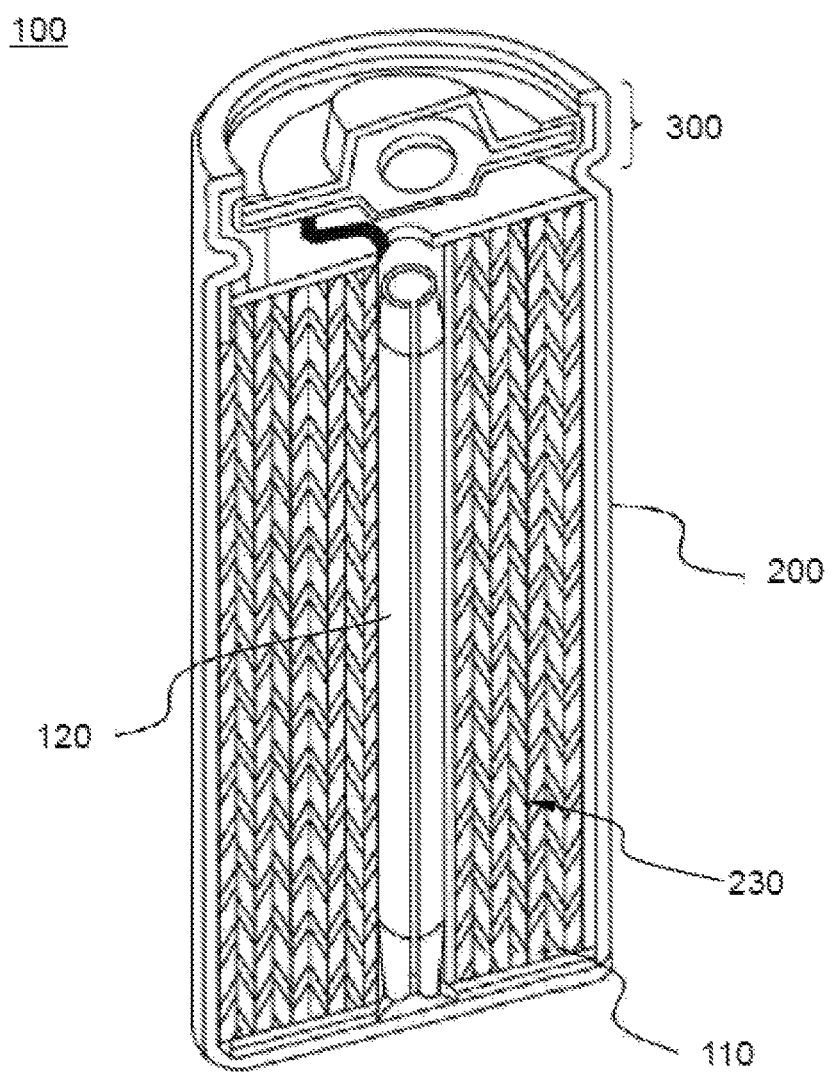

【FIG. 2】
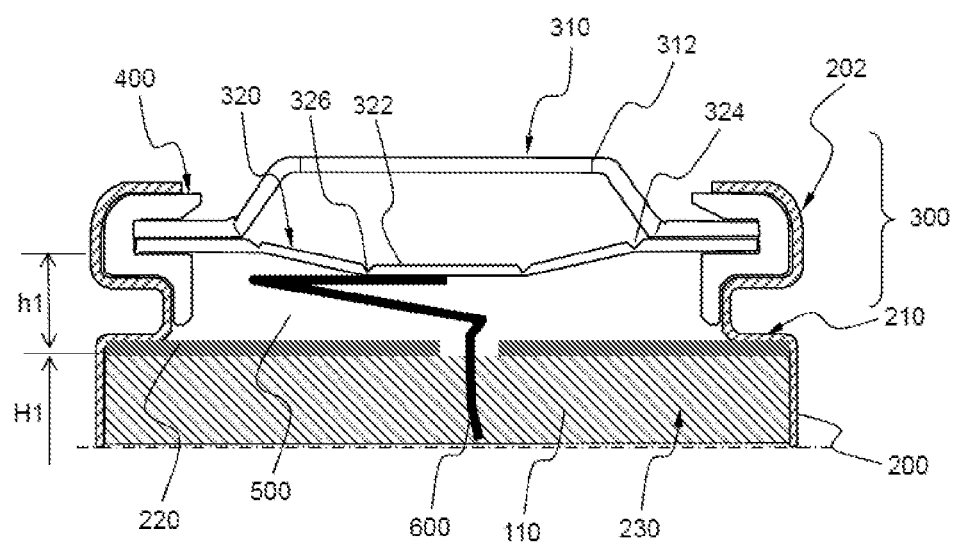
【FIG. 3】
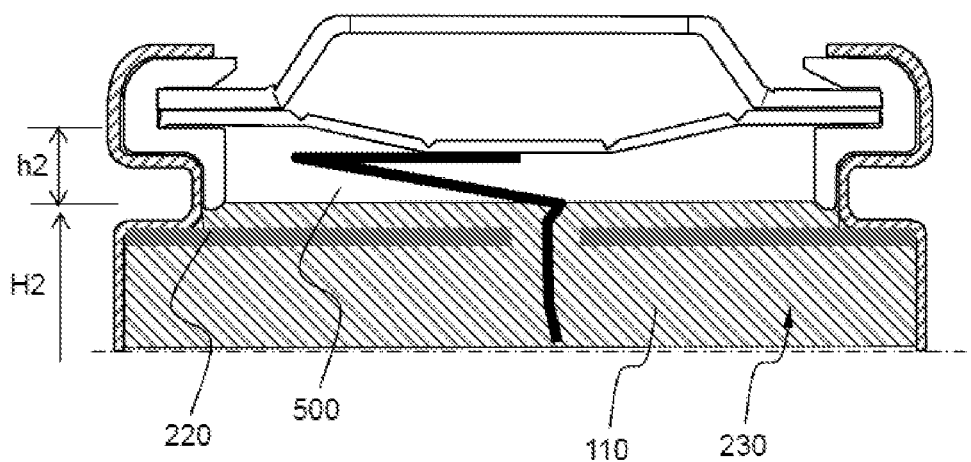

[FIG. 4]
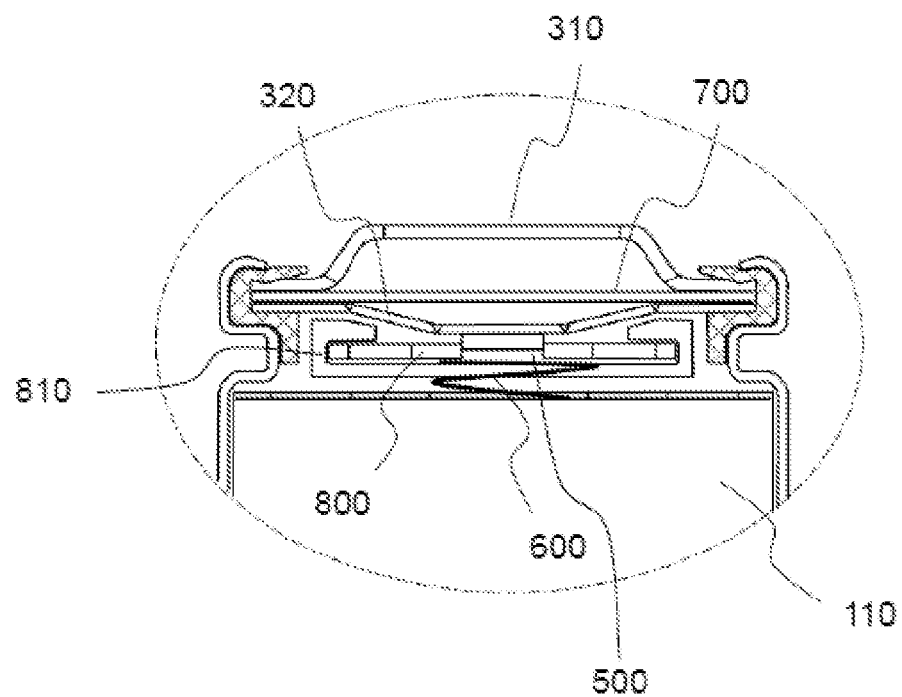

【FIG. 5】
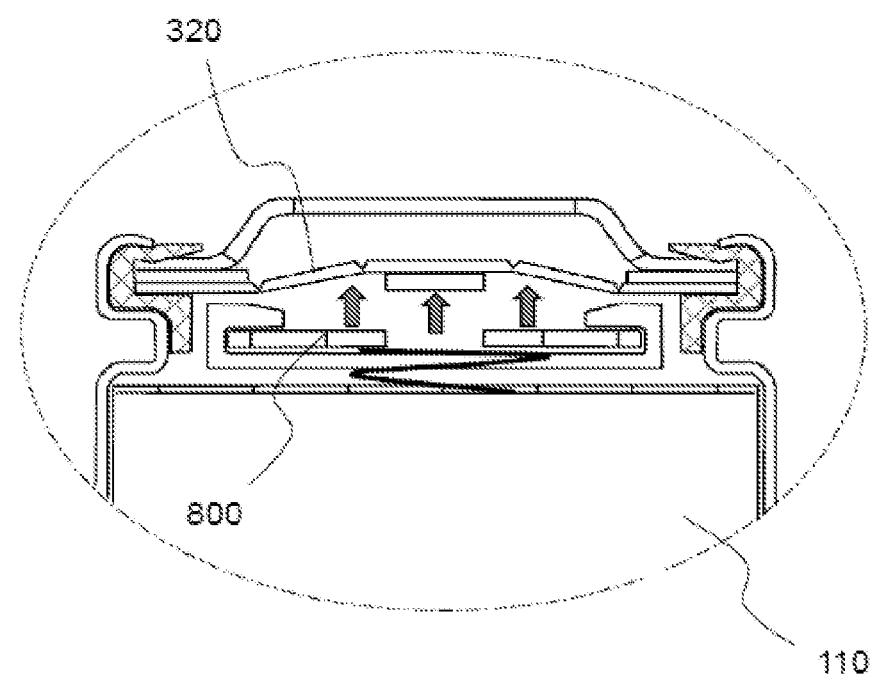

【FIG. 6】
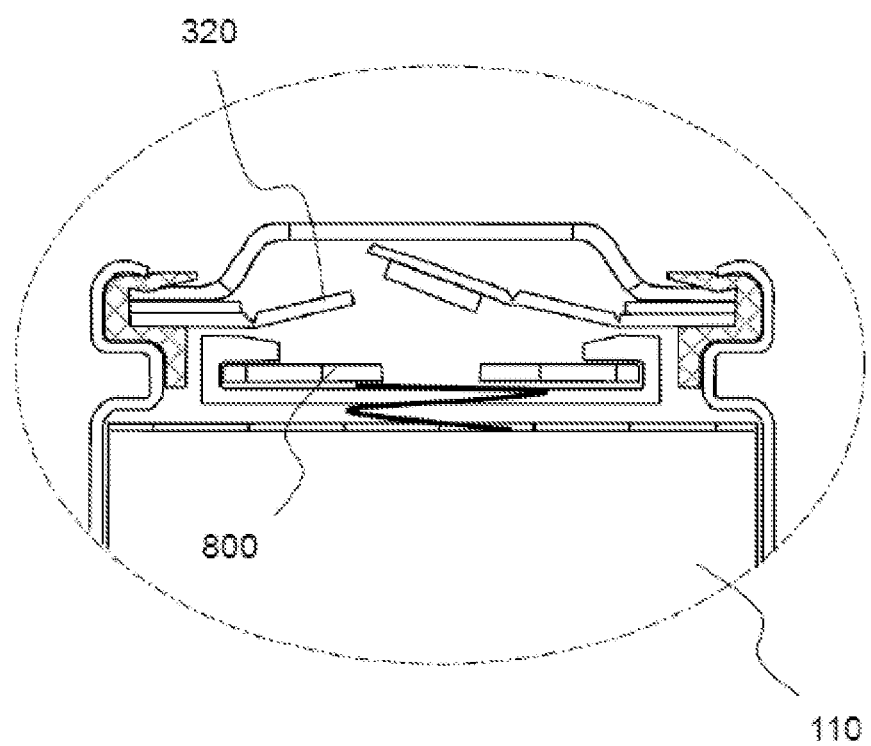

【FIG. 7】
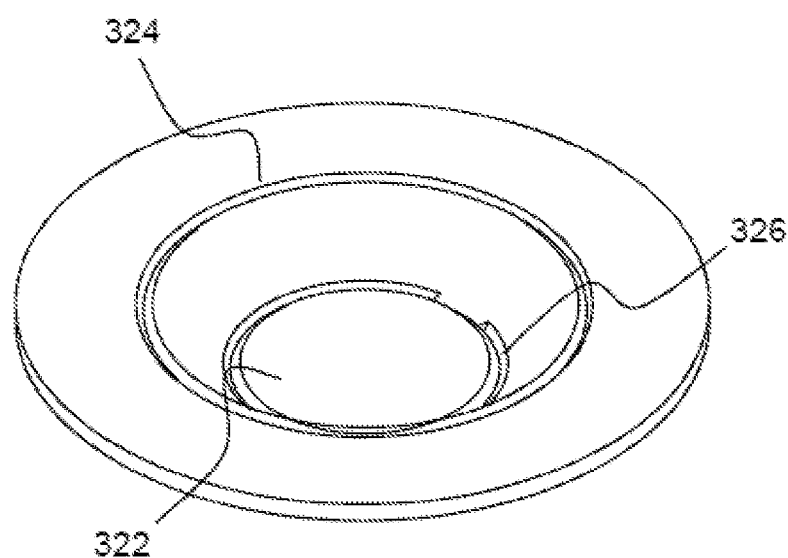

【FIG. 8】
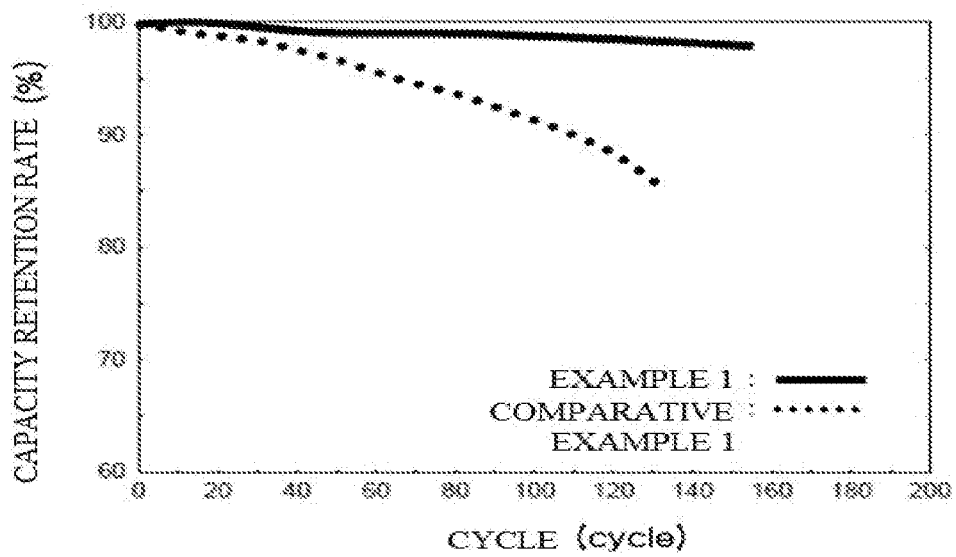
【FIG. 9】
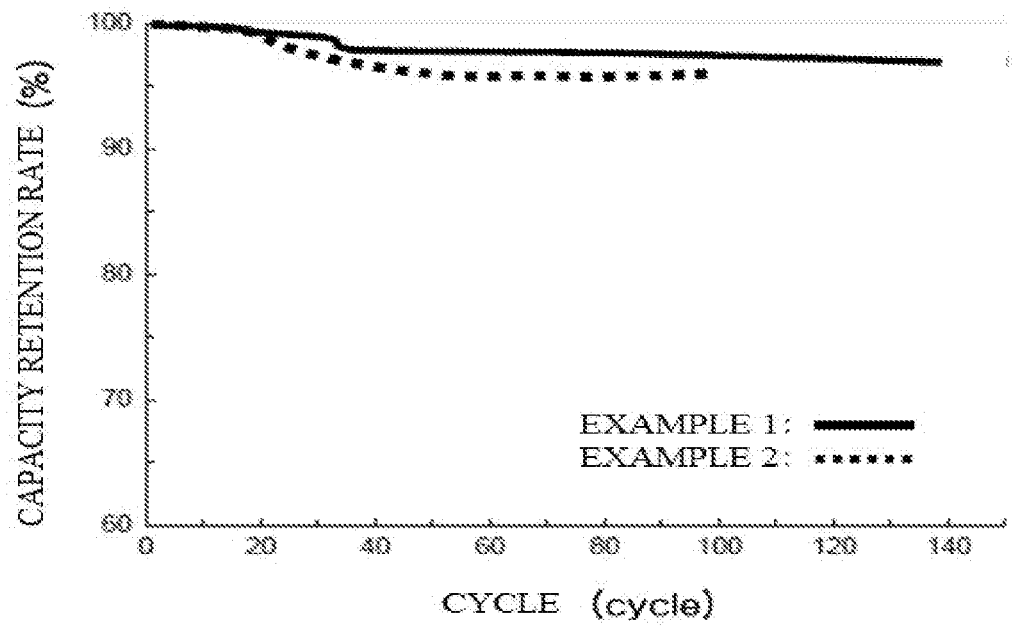

CYLINDRICAL BATTERY INCLUDING PRESSURIZING PART AND METHOD OF MANUFACTURING THE SAME

CROSS-REFERENCE TO RELATED APPLICATIONS

The present application is a national phase entry under 35 U.S.C. § 371 of International Application No. PCT/KR2015/009218 filed on Sep. 2, 2015 which claims priority from Korean Patent Application No. 10-2014-0130182 filed on Sep. 29, 2014 with the Korean Intellectual Property Office, the disclosures of which are herein incorporated by reference in their entirety.

TECHNICAL FIELD

The present invention relates to a cylindrical battery including a pressurizing part and a method of manufacturing the same.

BACKGROUND ART

The rapid increase in the use of fossil fuels has accelerated the demand for alternative energy sources or clean energy sources, and research has been actively carried out into power generation and power storage using electrochemistry.

A typical example of an electrochemical device using such electrochemical energy is a secondary battery, which has been increasingly used in various fields.

Based on the shape of a battery case, secondary batteries may be classified into a cylindrical battery having an electrode assembly mounted in a cylindrical metal container, a prismatic battery having an electrode assembly mounted in a prismatic metal container, and a pouch-shaped battery having an electrode assembly mounted in a pouch-shaped case made of an aluminum laminate sheet. The cylindrical battery has advantages in that the cylindrical battery has a large capacity and in that the cylindrical battery is structurally stable.

In addition, the electrode assembly mounted in the battery case functions as a power generating element, having a positive electrode/separator/negative electrode stack structure, which can be charged and discharged. The electrode assembly may be classified as a jelly-roll type electrode assembly configured to have a structure in which a long sheet type positive electrode and a long sheet type negative electrode, to which active materials are applied, are wound in the state in which a separator is disposed between the positive electrode and the negative electrode or a stacked type electrode assembly configured to have a structure in which a plurality of positive electrodes having a predetermined size and a plurality of negative electrodes having a predetermined size are sequentially stacked in the state in which separators are disposed respectively between the positive electrodes and the negative electrodes. The jelly-roll type electrode assembly has advantages in that it is easy to manufacture the jelly-roll type electrode assembly and in that the jelly-roll type electrode assembly has high energy density per unit weight.

Meanwhile, lithium-containing cobalt oxides, such as $LiCoO_2$, are mainly used as positive electrode active materials for lithium secondary batteries. In addition, lithium-containing manganese oxides, such as $LiMnO_2$ having a layered crystal structure and $LiMn_2O_4$ having a spinel crystal structure, and lithium-containing nickel oxides, such as $LiNiO_2$, are also used.

Among positive electrode active materials, $LiCoO_2$ is widely used due to its excellent overall physical properties, such as excellent cycle properties. However, $LiCoO_2$ is low in safety and expensive due to limited resources of cobalt, which is a raw material therefor. Lithium nickel-based oxides, such as $LiNiO_2$, are cheaper than $LiCoO_2$, and exhibit a high discharge capacity when charged to a voltage of 4.25 V. However, lithium nickel-based oxides have problems, such as high production cost, swelling due to gas generated in batteries, low chemical stability, and high pH.

In addition, lithium manganese oxides, such as $LiMnO_2$ and $LiMn_2O_4$, are advantageous in that they contain manganese, which is an abundant and environmentally friendly raw material, and thus are drawing much attention as a positive electrode active material that can replace $LiCoO_2$. In particular, among the lithium manganese oxides, $LiMn_2O_4$ has advantages, such as a relatively inexpensive price and high output. On the other hand, $LiMn_2O_4$ has lower energy density than $LiCoO_2$ and three component-based active materials.

In order to overcome these disadvantages, some of the Mn in $LiMn_2O_4$ is substituted with Ni and thereby $LiMn_2O_4$ has a higher potential (approximately 4.7 V) than its original operating potential (approximately 4 V). Due to the high potential, a spinel material having a composition of $Li_{1+a}Ni_xMn_{2-x}O_{4-z}$ ($0 \leq a \leq 0.1$, $0.4 \leq x \leq 0.5$, and $0 \leq z \leq 0.1$) is well suited to use as a positive electrode active material of a middle or large-sized lithium ion battery for electric vehicles (EV), which require high energy and high-output performance. However, the lifespan characteristics of the battery may be reduced due to dissolution of Mn in the positive electrode active material and side reactions of an electrolytic solution caused by the high charge and discharge voltage potential.

Therefore, there is a high necessity for technology that is capable of improving the lifespan characteristics of a battery while using a positive electrode active material containing a high content of Mn, as described above.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have found that, in the case in which a cylindrical battery using a positive electrode active material containing a high content of Mn includes a pressurization part located between a safety vent and a receiving part for applying a predetermined pressure to the receiving part, as will be described hereinafter, it is possible to achieve unexpected excellent effects. The present invention has been completed based on these findings.

Technical Solution

In accordance with one aspect of the present invention, the above and other objects can be accomplished by the provision of a cylindrical battery including an electrode assembly (jelly roll) including a positive electrode, a separator, and a negative electrode, a cylindrical container including a receiving part for receiving the electrode assembly together with an electrolytic solution, a cap assembly mounted to an open upper end of the cylindrical container, a safety vent mounted in the cap assembly, the safety vent having a notch configured to rupture by the pressure of gas present in the cylindrical battery, and a pressurization part located between the safety vent and the receiving part, the pressurization part communicating with the receiving part, the pressurization part being configured to apply a predetermined pressure, which is generated by gas, to the receiving part, wherein the positive electrode includes a lithium composite transition metal oxide represented by Formula 1 below as a positive electrode active material.

$$Li_{1+a}Ni_bM_cMn_{2-(b+c)}O_{4-z} \quad (1)$$

where M is at least one element selected from a group consisting of Ti, Co, Al, Cu, Fe, Mg, B, Cr, Zr, Zn, and period 2 transition metals, $0 \leq a \leq 0.1$, $0.4 \leq b \leq 0.5$, $0 \leq c \leq 0.1$, and $0 \leq z \leq 0.1$.

In the case in which a positive electrode active material containing a high content of Mn as represented by Formula 1 above is used, the capacity of the battery is excessively reduced as the battery is repeatedly charged and discharged. In the case in which the pressurization part is provided, however, a reduction in the capacity of the battery is restrained, thereby improving the lifespan characteristics of the battery.

The capacity of the battery may be reduced due to various causes. For example, the capacity of the battery may be reduced due to a gas trap that is formed by gas generated by decomposition of the electrolytic solution during charging and discharging of the battery, a hydrofluoric acid (HF) layer formed by decomposition of lithium salt contained in the electrolytic solution, a lithium fluoride (LiF) layer nonuniformly formed on the surface of the negative electrode, and dissolution of $Mn^{2+}$, present in the positive electrode active material, to the electrolytic solution.

In the case in which a positive electrode active material containing a high content of Mn is used, the positive electrode active material is activated or operated at a high-voltage potential. Consequently, the operating potential reaches the oxidation potential of the electrolytic solution, with the result that the electrolytic solution is further decomposed, whereby the gas trap is increased. The electrolytic solution cannot reach the gas trap, with the result that the exchange of lithium ions between the active materials is not possible, whereby the capacity of the battery is reduced in proportion to the volume of the gas trap.

The pressure and volume of gas are inversely proportional to each other (Boyle's Law). In the case in which pressure is applied to the interior of the battery as in the present invention, therefore, it is possible to reduce the volume of the gas trap even when the same amount of gas is generated, whereby it is also possible to restrain a reduction in the capacity of the battery. When pressure is applied to the receiving part through the pressurization part, therefore, it is possible to reduce the volume of the gas trap, thereby improving the lifespan characteristics of the battery.

Meanwhile, HF and LiF are mainly formed through the decomposition of lithium salt, such as $LiPF_6$, contained in the electrolytic solution. In particular, HF acidifies the electrolytic solution to accelerate dissolution of Mn in the positive electrode active material. As a result, the crystalline structure of the positive electrode active material is destroyed, which causes a reduction in the capacity of the battery.

LiF is formed on the surface of the negative electrode. In the case in which LiF is thin and uniform, LiF does cause a great problem. In the case in which LiF is nonuniform and thick, however, the exchange of lithium ions is difficult on the portion at which LiF is formed, which causes a reduction in the capacity of the battery.

The inventors of the present application have found that, in the case in which the battery is operated under a low pressure and a gas trap is locally formed as the result of the generation of gas, overpotential is generated in the gas trap, whereby strong side reactions, such as decomposition of the electrolytic solution, occur. As a result, a thick LiF layer is locally formed on the surface of the negative electrode.

In the case in which the battery is operated under a high pressure, on the other hand, reaction is uniformly performed over the surface of the electrode, with the result that a thin LiF layer is uniformly formed on the surface of the negative electrode. In the case in which pressure is applied to the interior of the battery through the pressurization part as in the present invention, therefore, it is possible to improve the lifespan characteristics of the battery due to the uniformity of the reaction in the battery.

In consideration of the structural stability of the battery, the pressurization part may be more appropriately mounted in a cylindrical battery, having good ability to withstand pressure in the battery since a cylindrical container is more useful than a pouch-shaped battery, the durability of which is low since a laminate sheet is thermally fused.

In a concrete example, the pressurization part may contain gas at a pressure of 3 to 25 atm. Specifically, the pressurization part may contain gas at a pressure of 10 to 25 atm. More specifically, the pressurization part may contain gas at a pressure of 15 to 25 atm.

In the case in which the pressurization part may contain gas at a pressure of less than 3 atm, the effect of applying pressure to the receiving part to reduce the volume of the gas trap or reduce side reactions may not be great, which is undesirable. In the case in which the pressurization part may contain gas at a pressure of greater than 25 atm, on the other hand, the safety of the battery may be reduced, which is also undesirable.

Meanwhile, the gas may include gas generated by decomposition of the electrolytic solution during charging and discharging for battery activation. During charging and discharging for battery activation, a large amount of gas is generated as the result of side reactions. In the case in which a desired pressure is generated in the pressurization part using this gas, an additional gas injection step is not needed, whereby it is possible to simplify the process and to reduce process costs.

In a concrete example, the pressurization part may have a volume equivalent to 0.1% to 20%, specifically 0.1% to 10%, more specifically 0.1% to 2%, of the volume of the receiving part.

In the case in which the volume of the pressurization part is less than 0.1% of the volume of the receiving part, the pressure in the pressurization part may be excessively increased, with the result that the safety of the battery may be reduced, which is undesirable. In the case in which the volume of the pressurization part is greater than 20% of the volume of the receiving part, on the other hand, the efficiency of use of space in the battery may be reduced, and energy density may also be reduced, which is also undesirable.

In a concrete example, the electrolytic solution may be excessively received in the receiving part such that the electrode assembly is completely impregnated with the electrolytic solution.

In the case in which the electrode assembly is not completely impregnated with the electrolytic solution, i.e. in the case in which the electrode assembly is partially impregnated with the electrolytic solution, it is difficult to discharge gas generated in the electrode assembly from the electrode assembly, since the mobility of the electrolytic solution is relatively low. In addition, the gas may remain in the electrode assembly, whereby the likelihood that a gas trap will be formed may be further increased.

In the case in which the electrode assembly is completely impregnated with the electrolytic solution, on the other hand, gas generated in the electrode assembly may be easily discharged from the electrode assembly due to the mobility of the electrolytic solution, with the result that the likelihood that a gas trap will be formed may be reduced.

In a concrete example, the negative electrode may include carbon, such as non-graphitizing carbon or graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 \leq x \leq 1$; $1 \leq y \leq 3$; $1 \leq z \leq 8$); a lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; a Li—Co—Ni based material; a titanium oxide; or a lithium metal oxide represented by Formula 2 below as a negative electrode active material.

$$Li_aM'_bO_{4-c}A_c \quad (2)$$

where M' is at least one element selected from a group consisting of Ti, Sn, Cu, Pb, Sb, Zn, Fe, In, Al, and Zr, $0.1 \leq a \leq 4$ and $0.2 \leq b \leq 4$ in which a and b are determined according to the oxidation number of M', $0 \leq c < 0.2$ in which c is determined according to oxidation number, and A is at least one monovalent or divalent anion.

Specifically, the lithium metal oxide of Formula 2 may be a lithium titanium oxide (LTO) represented by Formula 3. Concretely, the lithium titanium oxide may be $Li_{0.8}Ti_{2.2}O_4$, $Li_{2.67}Ti_{1.33}O_4$, $LiTi_2O_4$, $Li_{1.33}Ti_{1.67}O_4$, or $Li_{1.14}Ti_{1.71}O_4$. However, the composition and kind of the lithium titanium oxide are not particularly restricted, as long as the lithium titanium oxide is capable of storing and discharging lithium ions. More specifically, the lithium titanium oxide may be a spinel-structure lithium titanium oxide that exhibits a small change in crystalline structure during charging and discharging thereof and has high reversibility, such as $Li_{1.33}Ti_{1.67}O_4$ or $LiTi_2O_4$.

$$Li_aTi_bO_4 \quad (3)$$

where $0.5 \leq a \leq 3$ and $1 \leq b \leq 2.5$.

In the case in which a spinel lithium composite transition metal oxide having a relatively high potential is used as the positive electrode active material and an LTO having a high potential is used as the negative electrode active material, the rate characteristics of the battery may be improved, and Li plating on the negative electrode may be prevented.

Meanwhile, the safety vent is a kind of safety element for discharging gas from the battery when the pressure in the battery is increased due to abnormal operation of the battery or deterioration of components constituting the battery, thereby securing the safety of the battery. For example, when gas is generated in the battery with the result that the pressure in the battery exceeds a critical value, the safety vent may rupture, and the gas may be discharged through one or more gas discharge holes formed in the top cap via the ruptured safety vent.

In the present invention, the safety vent may be set to rupture at a pressure of higher than 25 atm. Specifically, the safety vent may be set to rupture at a pressure of 30 atm or higher.

In a concrete example, the cap assembly may include a protruding top cap connected along the outer circumference of the safety vent. In addition, the cap assembly may further include a gasket mounted to the outer circumference of the top cap. A positive temperature coefficient (PTC) element for interrupting current by increasing battery resistance when the temperature in the battery increases may be interposed between the top cap of the cap assembly and the safety vent.

In addition, a current interruptive device (CID) for interrupting abnormal operating current of the battery and reducing the temperature in the battery may be mounted in the cap assembly.

Hereinafter, other components of the cylindrical battery will be described.

The positive electrode may be manufactured, for example, by applying a mixture of a positive electrode active material, a conductive agent, and a binder to a positive electrode current collector and drying and pressing the mixture. A filler may be further added to the mixture as needed.

In general, the positive electrode current collector has a thickness of 3 to 500 μm. The positive electrode current collector is not particularly restricted so long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. The positive electrode current collector may have a micro-scale uneven pattern formed at the surface thereof so as to increase the adhesive force of the positive electrode active material. The positive electrode current collector may be configured in various forms, such as a film, a sheet, a foil, a net, a porous body, a foam body, and a non-woven fabric body.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit the expansion of the positive electrode. There is no particular limit to the filler so long as the filler does not induce any chemical change in a battery to which the filler is applied and so long as the filler is made of a fibrous material. As examples of the filler, there may be used olefin polymers, such as polyethylene and polypropylene; and fibrous materials, such as glass fiber and carbon fiber.

On the other hand, the negative electrode is manufactured by applying, drying, and pressing a negative electrode active material to a negative electrode current collector. The above-described components, such as the conductive agent, the binder, and the filler, may be selectively added to the negative electrode active material as needed.

In general, the negative electrode current collector has a thickness of 3 to 500 µm. The negative electrode current collector is not particularly restricted so long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In the same manner as in the positive electrode current collector, the negative electrode current collector may have a micro-scale uneven pattern formed at the surface thereof so as to increase the adhesive force of the negative electrode active material. The negative electrode current collector may be configured in various forms, such as a film, a sheet, a foil, a net, a porous body, a foam body, and a non-woven fabric body.

The separator is interposed between the positive electrode and the negative electrode. As the separator, for example, an insulative thin film exhibiting high ion permeability and high mechanical strength may be used. The separator generally has a pore diameter of 0.01 to 10 µm and a thickness of 5 to 300 µm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The electrolytic solution contains lithium salt. A non-aqueous organic solvent, an organic solid electrolyte, or an inorganic solid electrolyte may be used as the electrolytic solution. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

According to circumstances, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolytic solution. In addition, according to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the electrolytic solution may further include carbon dioxide gas. In addition, fluoro-ethylene carbonate (FEC) and propene sultone (PRS) may be further included.

In a concrete example, lithium salt, such as $LiPF_6$, $LiClO_4$, $LiBF_4$, or $LiN(SO_2CF_3)_2$, may be added to a mixed solvent of cyclic carbonate, such as EC or PC, which is a high dielectric solvent, and linear carbonate, such as DEC, DMC, or EMC, which is a low viscosity solvent, to manufacture a non-aqueous electrolyte containing lithium salt.

In accordance with another aspect of the present invention, there is provided a device including the cylindrical battery.

Specific examples of such a device may be small-sized devices, such as a computer, a mobile phone, and a power tool, and middle or large-sized devices, such as a power tool driven by a battery-based motor, an electric automobile, including an electric vehicle (EV), a hybrid electric vehicle (HEV), and a plug-in hybrid electric vehicle (PHEV), an electric two-wheeled vehicle, including an electric bicycle (E-bike) and an electric scooter (E-scooter), an electric golf cart, and a power storage system. However, the present invention is not limited thereto.

The structure of the device is well known in the art to which the present invention pertains, and a detailed description thereof will be omitted.

In accordance with a further aspect of the present invention, there is provided a method of manufacturing the cylindrical battery, the method including (a) placing an electrode assembly (jelly roll) including a positive electrode, a separator, and a negative electrode in a receiving part of a cylindrical container, (b) adjusting the amount of electrolytic solution to be injected into the receiving part to adjust the relative volumes of the receiving part and a pressurization part formed between a safety vent and the receiving part, and (c) mounting a cap assembly to an open upper end of the cylindrical container.

In a concrete example, the method may further include (d) charging and discharging the cylindrical battery for activation of the cylindrical battery and collecting gas generated during the charging and discharging of the cylindrical battery in the pressurization part to generate a predetermined pressure, step (d) being carried out after step (c).

The receiving part and the pressurization part may communicate with each other. The gas generated in the battery may be collected in the pressurization part to generate a predetermined pressure. Consequently, the pressure in the pressurization part may be set based on the relative volumes of the receiving part and the pressurization part.

The pressure in the pressurization part may be changed depending on the concrete construction and the desired performance of the battery. The amount of electrolytic solution to be injected may be adjusted to adjust the relative volumes of the receiving part and the pressurization part, whereby a desired pressure is obtained.

In a concrete example, step (b) may include adjusting the relative volumes of the receiving part and the pressurization part such that the volume of the pressurization part is 0.1% to 20%, specifically 0.1% to 10%, more specifically 0.1% to 2%, of the volume of the receiving part.

At step (d), the predetermined pressure may be 3 to 25 atm, specifically 10 to 25 atm, more specifically 15 to 25 atm.

BRIEF DESCRIPTION OF DRAWINGS

The above and other objects, features and other advantages of the present invention will be more clearly understood from the following detailed description taken in conjunction with the accompanying drawings, in which:

FIG. 1 is a vertical sectional perspective view showing a general cylindrical battery;

FIG. 2 is a partial sectional view showing a cylindrical battery according to an embodiment of the present invention;

FIG. 3 is a partial sectional view showing a cylindrical battery according to another embodiment of the present invention, which is different from the cylindrical battery of FIG. 2 in terms of the amount of electrolytic solution that is injected;

FIGS. 4 to 6 are vertical sectional views showing a series of processes in which current is interrupted and high-pressure gas is discharged by the operation of a safety vent and a current interruptive device (CID) in a cylindrical battery according to a further embodiment of the present invention;

FIG. 7 is a perspective view showing a safety vent used in a cylindrical battery;

FIG. 8 is a graph showing a comparison of lifespan characteristics between Example 1 of the present invention and Comparative Example 1; and FIG. 9 is a graph showing a comparison of lifespan characteristics between Example 1 and Example 2 of the present invention.

BEST MODE

Now, exemplary embodiments of the present invention will be described in detail with reference to the accompanying drawings. It should be noted, however, that the scope of the present invention is not limited by the illustrated embodiments.

FIG. 1 is a vertical sectional perspective view schematically showing a general cylindrical battery, and FIGS. 2 and 3 are partial sectional views schematically showing cylindrical batteries according to embodiments of the present invention.

Referring first to FIGS. 1 and 2, a cylindrical battery 100 is manufactured by placing a jelly-roll type (i.e. wound type) electrode assembly 110 in a receiving part 230 of a cylindrical container 200, injecting an electrolytic solution into the receiving part 230 such that the electrode assembly 110 is completely impregnated with the electrolytic solution in the cylindrical container 200, and mounting a cap assembly 300 to the open upper end of the cylindrical container 200.

A pressurization part 500 is located between a safety vent 320 mounted in the cap assembly 300 and the receiving part 230 of the cylindrical container 200. The pressurization part 500 communicates with the receiving part 230. The pressurization part 500 applies a predetermined pressure, which is generated by gas, to the receiving part 230.

The electrode assembly 110 is configured to have a structure in which a positive electrode and a negative electrode are wound in a circle in the state in which a separator is interposed between the positive electrode and the negative electrode. A cylindrical center pin 120 is inserted into the center of the electrode assembly 110. The center pin 120 is generally made of a metal material such that the center pin 120 exhibits a predetermined strength. The center pin 120 is configured to have a hollow cylindrical structure formed by rolling a metal sheet. According to circumstances, the center pin 120 may be removed after the electrodes of the electrode assembly 110 are welded to the cylindrical container 200 or to the cap assembly 300.

The cap assembly 300 is configured to have a structure in which a top cap 310 and a safety vent 320 for lowering the internal pressure of the cylindrical battery are disposed in a gasket 400 mounted at the upper inner surfaces of a crimping part 202 and a beading part 210 of the cylindrical container 200 for maintaining airtightness in the state in which the top cap 310 and the safety vent 320 are in tight contact with each other. The middle portion of the top cap 310 protrudes upward such that the top cap 310 functions as a positive electrode terminal when the top cap 310 is connected to an external circuit, and a plurality of through holes 312, through which the gas present in the container 20 is discharged out of the container 20, is formed along the circumference of the protruding portion of the top cap 310.

The safety vent 320 is a thin film structure in which current flows. The safety vent 320 is provided at the center thereof with a concave center portion 322, which is recessed, and two notches 324 and 326 having different depths are formed at upper and lower bent regions of the concave center portion 322.

An insulative plate 220 for preventing contact between the electrode assembly 110 and an electrode lead 600 is mounted to the upper end of the electrode assembly 110 in order to prevent the occurrence of a short circuit in the battery due to the contact between the electrode assembly 110 and an electrode lead 600.

Meanwhile, the upper one of the notches 324 and 326, i.e. a first notch 324, forms a closed curve, and the lower one of the notches 324 and 326, i.e. a second notch 326, is configured to have an open curve structure, one side of which is open. In an example, the second notch 326 is more deeply formed than the first notch 324 such that the coupling force of the second notch 326 is smaller than the coupling force of the first notch 324.

When the internal pressure of the container 200 exceeds a critical pressure, therefore, the second notch 326 of the safety vent 320 is ruptured, with the result that gas is discharged from the container 200 through the through holes 312 of the top cap 310.

The volume of the pressurizing part 500 and the volume of the receiving part 230 are relative to each other. The relative volumes of the pressurizing part 500 and the receiving part 230 may be adjusted based on the amount of electrolytic solution that is injected into the receiving part 230. The electrolytic solution is injected up to the insulative plate 220 of the cylindrical battery 100. The volume of the pressurizing part 500 is proportional to h1, and the volume of the receiving part 230 is proportional to H1.

Referring to FIG. 3, for comparison with FIG. 2, a larger amount of electrolytic solution is injected into a cylindrical battery 100a than the cylindrical battery 100 such that the electrolytic solution is injected beyond the insulative plate 220. In this case, the receiving part 230 extends to a portion at which the electrolytic solution is injected beyond the insulative plate 220. In the cylindrical battery 100a, therefore, the volume of the receiving part 230 is larger than in the cylindrical battery 100. The volume of the receiving part 230 is proportional to H2. As the volume of the receiving part 230 is increased, the volume of the pressurizing part 500 is decreased. The volume of the pressurizing part 500 is proportional to h2.

FIGS. 4 to 6 show a series of processes in which a safety vent and a current interruptive device (CID) are operated in a cylindrical battery according to a further embodiment of the present invention, and FIG. 7 is a perspective view schematically showing the safety vent.

Referring to these figures, the top cap 310 protrudes to form a positive electrode. An exhaust hole is formed in the top cap 310. Under the top cap 310 are sequentially disposed a positive temperature coefficient (PTC) element 700 for interrupting current through significant increase of battery resistance when the interior temperature of the battery increases, a safety vent 320 configured to have a downwardly protruding shape in a normal state and configured to upwardly protrude and rupture to exhaust gas when the interior pressure of the battery increases, and a current interruptive device 800 coupled to the safety vent 320 at one side of the upper end thereof and connected to the positive electrode of the electrode assembly 110 at one side of the lower end thereof. The pressurization part 500 is located between the safety vent 320 and the electrode assembly 110. In addition, a gasket 810 for fixing the current interruptive device 800 surrounds the outer surface of the current interruptive device 800.

Under normal operating conditions, therefore, the positive electrode of the electrode assembly 110 is electrically connected to the top cap 310 via the electrode lead 600, the current interruptive device 800, the safety vent 320, and the PTC element 700, thereby achieving electrical conduction.

However, when gas is generated due to overcharge of the battery with the result that the pressure in the pressurization part 500 is increased, however, the shape of the safety vent 320 is reversed, i.e. upwardly protrudes, as shown in FIG. 5. At this time, the safety vent 320 is separated from the current interruptive device 800, whereby current is interrupted. As a result, the battery is not overcharged any further, whereby the safety of the battery is secured. If the internal pressure is continuously increased, nevertheless, the safety vent 320 is ruptured, and the pressurized gas is discharged through the exhaust hole of the top cap 310 via the ruptured safety vent, as shown in FIG. 6. Consequently, the battery is prevented from exploding.

Now, the present invention will be described in more detail with reference to the following examples. These examples are provided only for illustration of the present invention and should not be construed as limiting the scope of the present invention.

Example 1

90 weight % of $LiNi_{0.5}Mn_{1.5}O_4$ as a positive electrode active material, 5 weight % of a conductive agent (Super-P), and 5 weight % of a binder (PVdF) were mixed with N-methyl-2-pyrrolidone (NMP) to prepare a positive electrode mixture. Subsequently, the positive electrode mixture was coated, pressed, and dried over aluminum foil having a thickness of 20 μm to manufacture a positive electrode.

90 weight % of a negative electrode active material ($Li_{1.33}Ti_{1.67}O_4$), 5 weight % of a conductive agent (Super-P), and 5 weight % of a binder (PVdF) were mixed with NMP to prepare a negative electrode mixture. Subsequently, the negative electrode mixture was coated, pressed, and dried over copper foil having a thickness of 20 μm to manufacture a negative electrode.

A separator having a thickness of 20 μm was interposed between the positive electrode and the negative electrode manufactured as described above to manufacture an electrode assembly. Subsequently, the electrode assembly was received in a cylindrical container, 4.2 g of an electrolytic solution, including ethylene carbonate (EC), dimethyl carbonate (DMC), and ethyl methyl carbonate (EMC), which were mixed at a ratio in volume of 1:1:1, and $LiPF_6$ having a concentration of 1 M as lithium salt, was injected into the cylindrical container, and a cap assembly was mounted to the open upper end of the cylindrical container in a sealed state to manufacture a cylindrical battery. At this time, the volume of a pressurization part was 2% of the volume of a receiving part.

Example 2

A cylindrical battery was manufactured in the same manner as in Example 1 except that 3.5 g of an electrolytic solution was injected into a cylindrical container. At this time, the volume of a pressurization part was 2.5% of the volume of a receiving part.

Comparative Example 1

A pouch-shaped battery was manufactured in the same manner as in Example 1 except that an electrode assembly and an electrolytic solution were received in a pouch-shaped battery case, rather than a cylindrical container, after which the pouch-shaped battery case was thermally fused to manufacture the pouch-shaped battery.

Experimental Example 1

The batteries manufactured according to Example 1, Example 2, and Comparative Example 1 were charged and discharged at 1 C in a chamber having a temperature of 25° C. to measure capacity retention rates of the batteries. The results are shown in FIGS. 8 and 9.

Referring to FIG. 8, the capacity of the pouch-shaped battery manufactured according to Comparative Example 1 was abruptly reduced as the pouch-shaped battery was repeatedly charged and discharged, whereas the cylindrical battery manufactured according to Example 1 exhibited a high capacity retention rate even after 100 cycles.

These results show that, in the case in which a positive electrode active material containing a high content of Mn is used in a cylindrical battery that includes a pressurization part, the lifespan characteristics of the battery are considerably improved, compared to the case in which in which a positive electrode active material containing a high content of Mn is used in a pouch-shaped battery that does not include a pressurization part.

Referring to FIG. 9, the capacity retention rate of the cylindrical battery manufactured according to Example 2 was reduced to about 95% after about 40 cycles, whereas the capacity retention rate of the cylindrical battery manufactured according to Example 1 was about 97% even after 120 cycles.

The pressure in the pressurization part of the cylindrical battery manufactured according to Example 1, the volume of the pressurization part of which was smaller than the volume of the pressurization part of the cylindrical battery manufactured according to Example 2, was higher than the pressure in the pressurization part of the cylindrical battery manufactured according to Example 2. It can be seen that the lifespan characteristics of the battery are further improved due to the difference in pressure.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in a cylindrical battery according to the present invention and a method of manufacturing the same, a pressurization part, which applies a predetermined pressure to a receiving part, is provided, whereby it is possible to reduce the volume of a gas trap and to reduce side reactions, thereby improving the lifespan characteristics of the battery.

The invention claimed is:

1. A cylindrical battery comprising:
an electrode assembly comprising a positive electrode, a separator, and a negative electrode;
a cylindrical container comprising a receiving part for receiving the electrode assembly together with an electrolytic solution;
a cap assembly mounted to an open upper end of the cylindrical container;
a safety vent mounted in the cap assembly, the safety vent having a notch configured to rupture by a pressure of gas present in the cylindrical battery; and
a pressurization part located between the safety vent and the receiving part, the pressurization part communicating with the receiving part, the pressurization part being configured to apply a predetermined pressure, which is generated by gas, to the receiving part, wherein
the positive electrode comprises a lithium composite transition metal oxide represented by Formula 1 as a positive electrode active material, $$Li_{1+a}Ni_bM_cMn_{2-(b+c)}O_{4-z} \quad (1)$$

where M is at least one element selected from a group consisting of Ti, Co, Al, Cu, Fe, Mg, B, Cr, Zr, Zn, and period 2 transition metals, $0 \leq a \leq 0.1$, $0.4 \leq b \leq 0.5$, $0 \leq c \leq 0.1$, and $0 \leq z \leq 0.1$.

2. The cylindrical battery according to claim 1, wherein the pressurization part contains gas at a pressure of 3 to 25 atm.

3. The cylindrical battery according to claim 2, wherein the pressurization part contains gas at a pressure of 10 to 25 atm.

4. The cylindrical battery according to claim 1, wherein the gas comprises gas generated by decomposition of the electrolytic solution during charging and discharging for battery activation.

5. The cylindrical battery according to claim 1, wherein the pressurization part has a volume equivalent to 0.1% to 2% of a volume of the receiving part.

6. The cylindrical battery according to claim 1, wherein the electrolytic solution is received in the receiving part such that the electrode assembly is completely impregnated with the electrolytic solution.

7. The cylindrical battery according to claim 1, wherein the safety vent is set to rupture at a pressure of higher than 25 atm.

8. The cylindrical battery according to claim 7, wherein the safety vent is set to rupture at a pressure of 30 atm or higher.

9. The cylindrical battery according to claim 1, wherein the negative electrode comprises a lithium metal oxide represented by Formula 2 as a negative electrode active material $$Li_aM'_bO_{4-c}A_c \quad (2)$$

where M' is at least one element selected from a group consisting of Ti, Sn, Cu, Pb, Sb, Zn, Fe, In, Al, and Zr, $0.1 \leq a \leq 4$ and $0.2 \leq b \leq 4$ in which a and b are determined according to oxidation number of M', $0 \leq c < 0.2$ in which c is determined according to oxidation number, and A is at least one monovalent or divalent anion.

10. The cylindrical battery according to claim 9, wherein the lithium metal oxide of Formula 2 is a lithium titanium oxide (LTO) represented by Formula 3

$$Li_aTi_bO_4 \quad (3)$$

where $0.5 \leq a \leq 3$ and $1 \leq b \leq 2.5$.

11. The cylindrical battery according to claim 10, wherein the lithium titanium oxide of Formula 3 is $Li_{1.33}Ti_{1.67}O_4$ or $LiTi_2O_4$.

12. The cylindrical battery according to claim 1, wherein the cap assembly comprises a protruding top cap connected along an outer circumference of the safety vent.

13. The cylindrical battery according to claim 12, wherein the cap assembly further comprises a gasket mounted to an outer circumference of the top cap.

14. The cylindrical battery according to claim 12, wherein a positive temperature coefficient (PTC) element is interposed between the top cap of the cap assembly and the safety vent.

15. A device comprising the cylindrical battery according to claim 1.

16. The device according to claim 15, wherein the device is a computer, a mobile phone, a wearable electronic device, a power tool, an electric vehicle (EV), a hybrid electric vehicle, a plug-in hybrid electric vehicle, an electric two-wheeled vehicle, an electric golf cart, or a power storage system.

17. A method of manufacturing the cylindrical battery according to claim 1, the method comprising:
  (a) placing the electrode assembly in the receiving part of the cylindrical container;
  (b) adjusting an amount of electrolytic solution to be injected into the receiving part to adjust relative volumes of the receiving part and the pressurization part; and
  (c) mounting the cap assembly to the open upper end of the cylindrical container.

18. The method according to claim 17, wherein step (b) comprises adjusting the relative volumes of the receiving part and the pressurization part such that the volume of the pressurization part is 0.1% to 2% of the volume of the receiving part.

19. The method according to claim 17, further comprising (d) charging and discharging the cylindrical battery for activation of the cylindrical battery and collecting gas generated during the charging and discharging of the cylindrical battery in the pressurization part to generate a predetermined pressure, step (d) being carried out after step (c).

20. The method according to claim 19, wherein, at step (d), the predetermined pressure is 3 to 25 atm.

* * * * *